US012300946B2

(12) United States Patent
Asano et al.

(10) Patent No.: US 12,300,946 B2
(45) Date of Patent: May 13, 2025

(54) CONNECTOR DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yasunori Asano, Mie (JP); Yutaka Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 343 days.

(21) Appl. No.: 17/775,050

(22) PCT Filed: Oct. 23, 2020

(86) PCT No.: PCT/JP2020/039871
§ 371 (c)(1),
(2) Date: May 6, 2022

(87) PCT Pub. No.: WO2021/095487
PCT Pub. Date: May 20, 2021

(65) Prior Publication Data

US 2022/0393411 A1 Dec. 8, 2022

(30) Foreign Application Priority Data

Nov. 13, 2019 (JP) ................................ 2019-205757

(51) Int. Cl.
*H01R 24/54* (2011.01)
*H01R 12/91* (2011.01)
(Continued)

(52) U.S. Cl.
CPC .......... *H01R 24/542* (2013.01); *H01R 12/91* (2013.01); *H01R 13/10* (2013.01); *H01R 13/42* (2013.01);
(Continued)

(58) Field of Classification Search
CPC ...... H01R 24/542; H01R 13/10; H01R 13/42; H01R 24/50; H01R 2103/00;
(Continued)

(56) References Cited

U.S. PATENT DOCUMENTS 6,497,579 B1 12/2002 Garbini
8,801,459 B2 * 8/2014 Mrowka ............... H01R 24/54 439/246
(Continued)

FOREIGN PATENT DOCUMENTS

CN 101350483 A 1/2009
CN 106785795 A 5/2017
(Continued)

OTHER PUBLICATIONS

International Search Report issued on Dec. 28, 2020 for WO 2021/095487 A1 (4 pages).

*Primary Examiner* — Briggitte R. Hammond
(74) *Attorney, Agent, or Firm* — Venjuris, P.C.

(57) ABSTRACT

It is aimed to improve workability at the time of assembling. A connector device is provided with a pair of connectors including terminal units and to be individually mounted on a pair of circuit boards facing each other, and an adaptor including a pair of connecting end parts swingably connectable to the terminal units. The connecting end part is formed with a hooking portion radially projecting from the connecting end part. The terminal unit is formed with a receiving portion for holding the adaptor in the connector by locking the hooking portion to the receiving portion.

6 Claims, 13 Drawing Sheets

(51) Int. Cl.

| | |
|---|---|
| ***H01R 13/10*** | (2006.01) |
| ***H01R 13/42*** | (2006.01) |
| ***H01R 24/50*** | (2011.01) |
| ***H01R 103/00*** | (2006.01) |

(52) U.S. Cl.
CPC ......... *H01R 24/50* (2013.01); *H01R 2103/00* (2013.01)

(58) Field of Classification Search
CPC .... H01R 12/7082; H01R 12/73; H01R 12/91; H01R 24/54; H01R 13/02; H01R 12/71
See application file for complete search history.

(56) References Cited

U.S. PATENT DOCUMENTS

| | | | | |
|---|---|---|---|---|
| 10,249,968 | B2 * | 4/2019 | Dandl .................. | H01R 12/716 |
| 2013/0102181 | A1 | 4/2013 | Aimoto | |

FOREIGN PATENT DOCUMENTS

| | | | |
|---|---|---|---|
| JP | 2000-215956 | A | 8/2000 |
| JP | 2017-152196 | A | 8/2017 |

* cited by examiner

CONNECTOR DEVICE

CROSS REFERENCE TO RELATED APPLICATIONS

This application is a national phase of PCT application No. PCT/JP2020/039871, filed on 23 Oct. 2020, which claims priority from Japanese patent application No. 2019-205757, filed on 13 Nov. 2019, all of which are incorporated herein by reference.

TECHNICAL FIELD

The present disclosure relates to a connector device.

BACKGROUND

Patent Document 1 discloses a connector device including a first connector and a second connector facing each other and configured to connect the first and second connectors via an adaptor. The adaptor is so mounted as to be relatively swingable with respect to the first connector. Since positional deviations of the both connectors are absorbed by the inclination of the adaptor when the first and second connectors are positionally deviated in a direction intersecting a facing direction, the both connectors can be connected.

PRIOR ART DOCUMENT

Patent Document

Patent Document 1: U.S. Pat. No. 8,801,459

SUMMARY OF THE INVENTION

Problems to be Solved

The above connectors can be mounted by fixing the first connector on the ceiling of a vehicle body and assembling the adaptor and the second connector from the inside of a vehicle interior. In this case, if the adaptor is attached to the first connector, the adaptor hangs vertically downward from the first connector by its own weight. Thus, the second connector is easily assembled with a lower end part of the adaptor. However, the adaptor may fall down by its own weight if the adaptor is only fit to the first connector. Therefore, a worker needs to support the adaptor with hand so that the adaptor does not fall down until the second connector is mounted.

A connector of the present disclosure was completed on the basis of the above situation and aims to improve workability at the time of assembling.

Means to Solve the Problem

The present disclosure is directed to a connector device with a pair of connectors including terminal units, the connectors being individually mounted on a pair of circuit boards facing each other, and an adaptor including a pair of connecting end parts swingably connectable to the terminal units, wherein the connecting end part is formed with a hooking portion radially projecting from the connecting end part, and the terminal unit is formed with a receiving portion for holding the adaptor in the connector by locking the hooking portion to the receiving portion.

Effect of the Invention

The connector device of the present disclosure is good in workability at the time of assembling.

DETAILED DESCRIPTION TO EXECUTE THE INVENTION

[Description of Embodiments of Present Disclosure]

Figure 1:
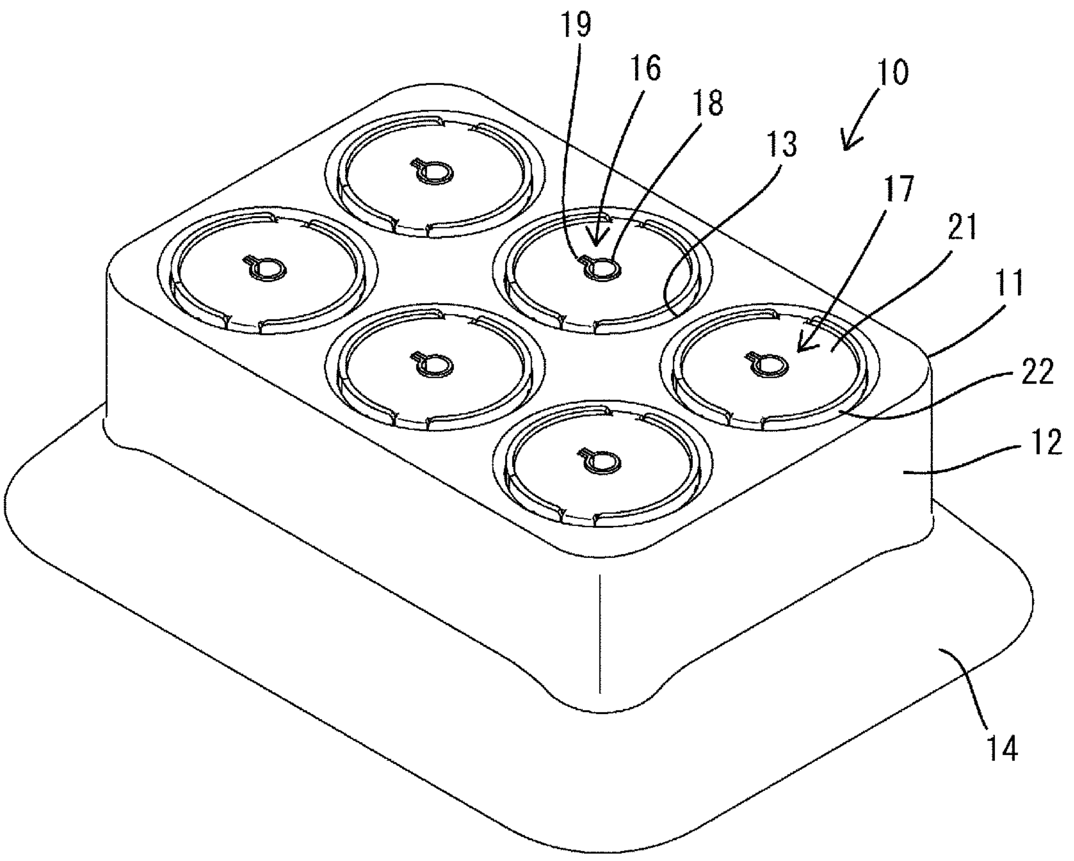
FIG. 1 is a perspective view of a first connector.

First, embodiments of the present disclosure are listed and described.

(1) The connector device of the present disclosure is provided with a pair of connectors including terminal units, the connectors being individually mounted on a pair of circuit boards facing each other, and an adaptor including a pair of connecting end parts swingably connectable to the terminal units, wherein the connecting end part is formed with a hooking portion radially projecting from the connecting end part, and the terminal unit is formed with a receiving portion for holding the adaptor in the connector by locking the hooking portion to the receiving portion. According to the configuration of the present disclosure, the adaptor can be held hanging from the connector by locking the hooking portion to the receiving portion. In this way, workability is good since the adaptor needs not be supported with hand until the adaptor and the other connector are connected.

(2) Preferably, the terminal unit includes a tapered guide portion for guiding the connecting end part to the receiving portion to achieve a locked state, and an inclination angle of the receiving portion with respect to a connecting direction of the terminal unit and the connecting end part is larger than an inclination angle of the tapered guide portion with respect to the connecting direction of the terminal unit and the connecting end part. According to this configuration, a locking function of the hooking portion and the receiving portion can be enhanced while a resistance generated when the connecting end part is guided to the receiving portion to achieve the locked state is reduced.

(3) In (2), preferably, the connecting end part is formed with a tapered slide contact portion configured to slide in contact with the tapered guide portion in the process of locking the hooking portion to the receiving portion, and an inclination angle of the tapered slide contact portion with respect to the connecting direction of the terminal unit and the connecting end part is equal to the inclination angle of the tapered guide portion with respect to the connecting direction of the terminal unit and the connecting end part. According to this configuration, since the tapered slide contact portion is guided in surface contact with the tapered guide portion, the tapered slide contact portion is not caught and the reliability of a guide function is excellent.

(4) Preferably, the receiving portion projects radially inward from an inner periphery of the terminal unit, the connecting end part includes a resilient arm portion, the hooking portion projects radially outward from the resilient arm portion, and a projecting end of the hooking portion is in resilient contact with the inner periphery of the terminal unit. According to this configuration, since a projecting dimension of the receiving portion from the inner periphery of the terminal unit is reliably secured as a locking margin in a radial direction between the receiving portion and the hooking portion, contact reliability is excellent.

(5) In (4), preferably, the hooking portions are disposed at a plurality of positions spaced apart in a circumferential direction, and a constant diameter portion having a constant inner diameter and continuous in a connecting direction of the terminal unit and the connecting end part is formed in a region contactable by the hooking portion, out of an inner periphery of the terminal unit. According to this configuration, even if the adaptor is inclined with respect to the connector, the plurality of hooking portions can reliably contact the constant diameter portion on the inner periphery of the terminal unit.

(6) In (4) or (5), preferably, the adaptor includes a dielectric and an outer conductor surrounding the dielectric, the outer conductor is formed with the resilient arm portion and a locking claw for holding the dielectric and the outer conductor in an assembled state, and the locking claw is formed in a region of the outer conductor except the resilient arm portion. According to this configuration, since the rigidity of the resilient arm portion is not reduced by forming the locking claw, the contact reliability of the terminal unit and the hooking portion is enhanced.

(7) Preferably, the connector includes a peripheral wall portion surrounding the adaptor with the connecting end part connected to the terminal unit, and the inclination of the adaptor is restricted by contact with the peripheral wall portion. According to this configuration, since the inclination of the adaptor is limited by the peripheral wall portion, the hooking portion can reliably contact the inner periphery of the terminal unit.

[Details of Embodiment of Present Disclosure]

[Embodiment]

Figure 2:
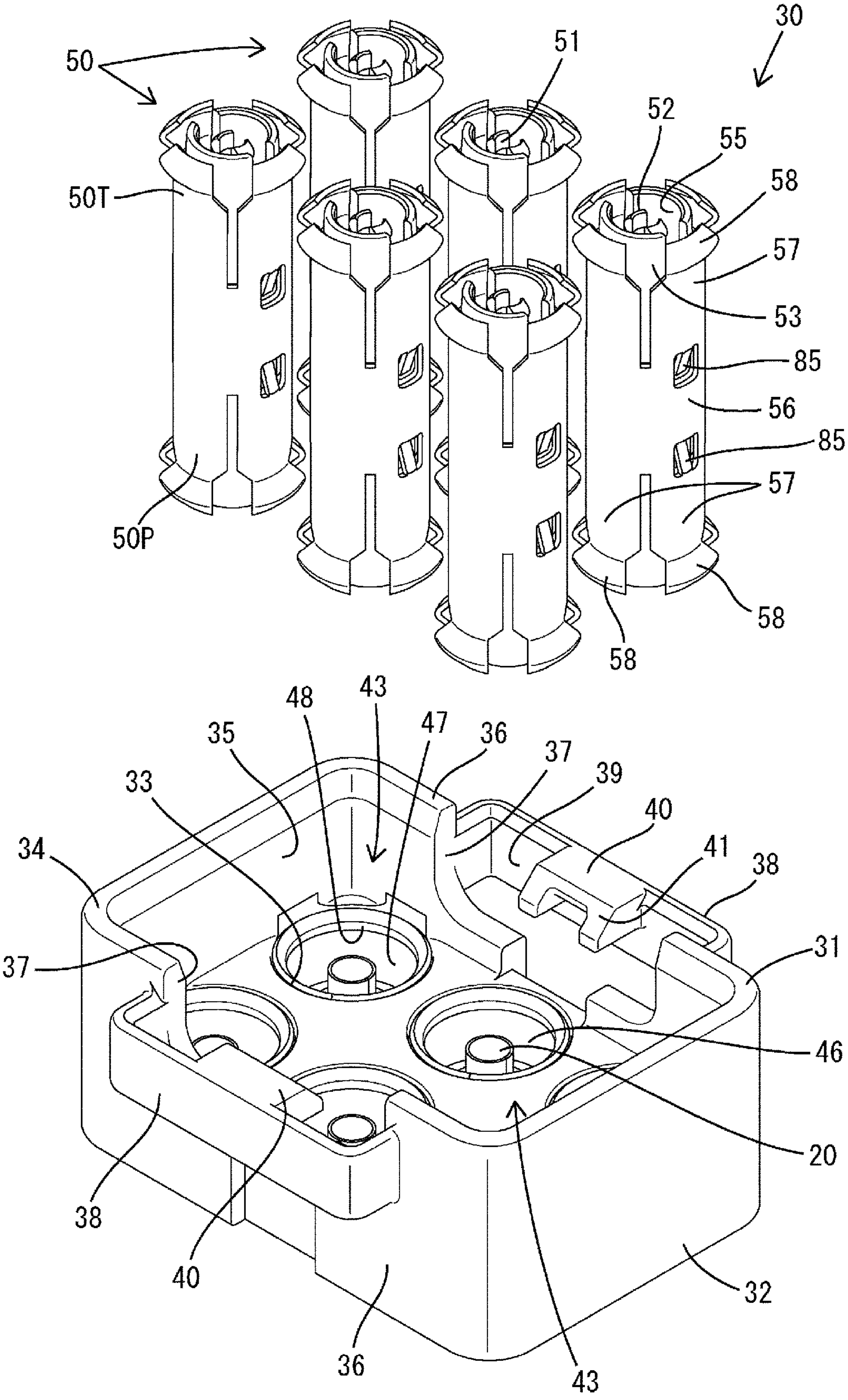
FIG. 2 is a perspective view showing a state where adaptors are separated in a second connector.
Figure 3:
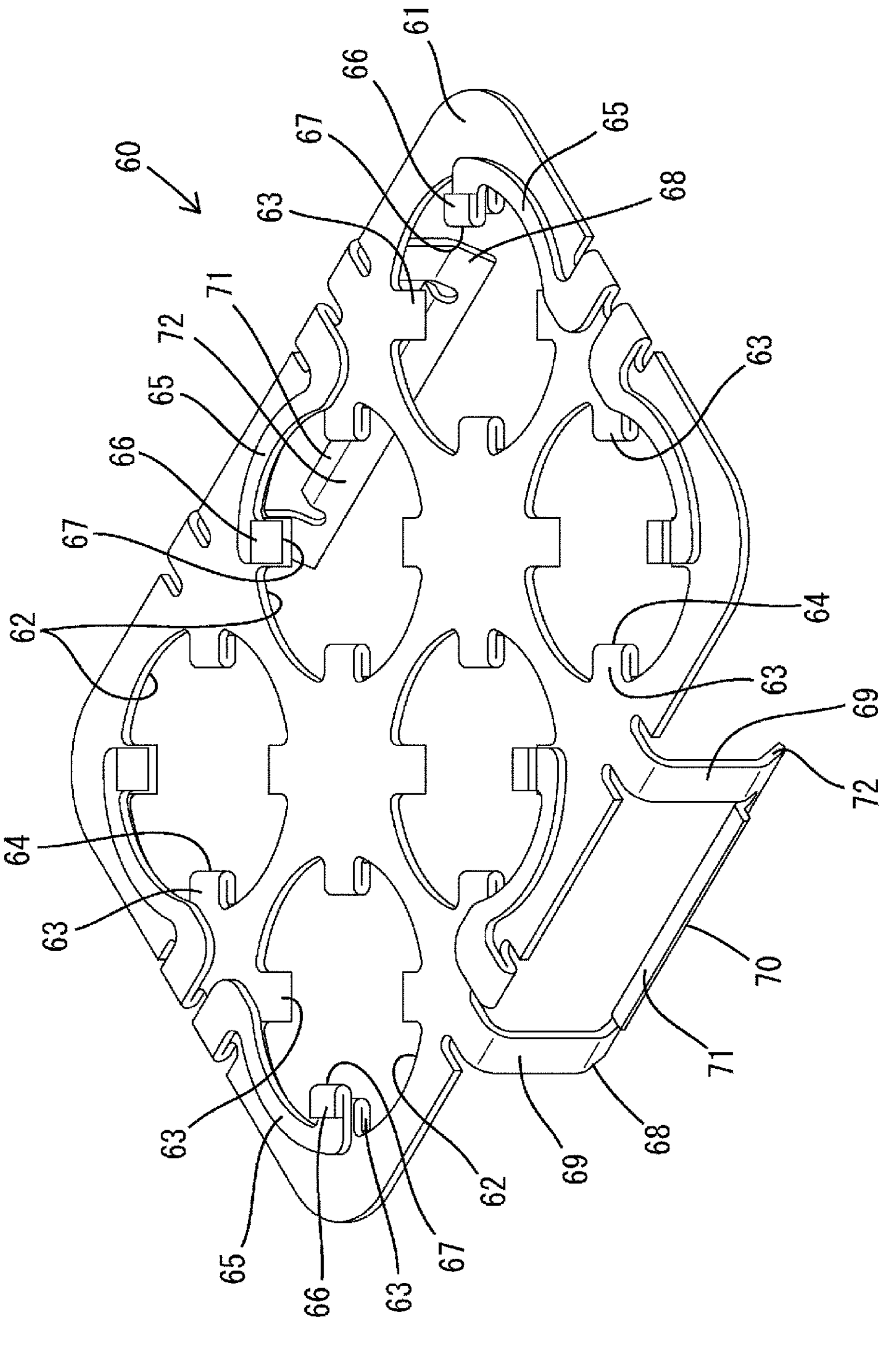
FIG. 3 is a perspective view of an alignment member.
Figure 4:
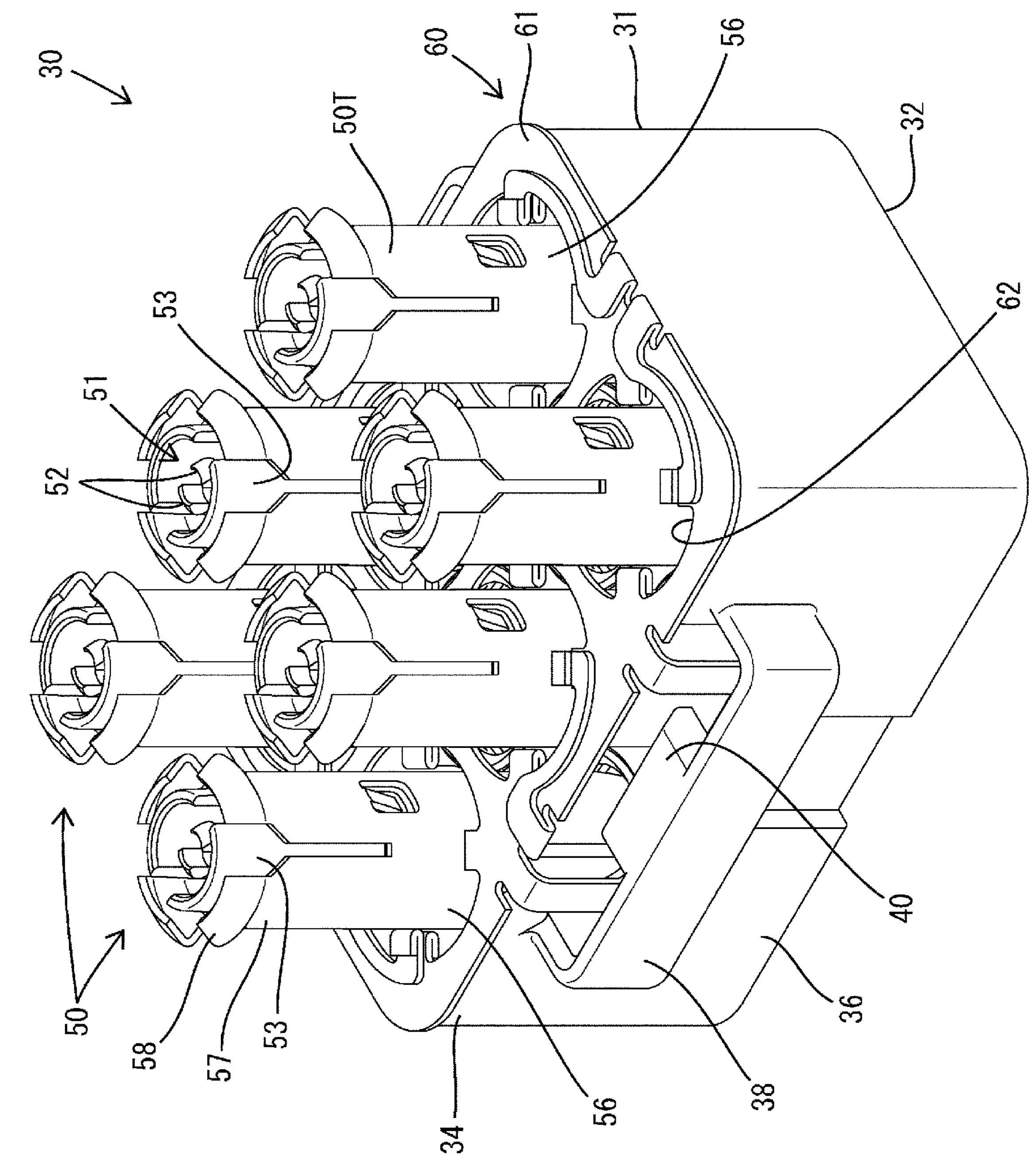
FIG. 4 is a perspective view of the second connector.

A specific embodiment of a connector device A of the present disclosure is described with reference to FIGS. 1 to 13. Note that the present invention is not limited to these illustrations and is intended to be represented by claims and include all changes in the scope of claims and in the meaning and scope of equivalents. In this embodiment, an oblique right-lower side in FIGS. 1 to 3 is defined as a front side concerning a front-rear direction. Upper and lower sides shown in FIGS. 1 to 5 and 7 are directly defined as upper and lower sides concerning a vertical direction. An oblique left-lower side in FIGS. 1 to 3 is defined as a left side concerning a lateral direction.

Figure 7:
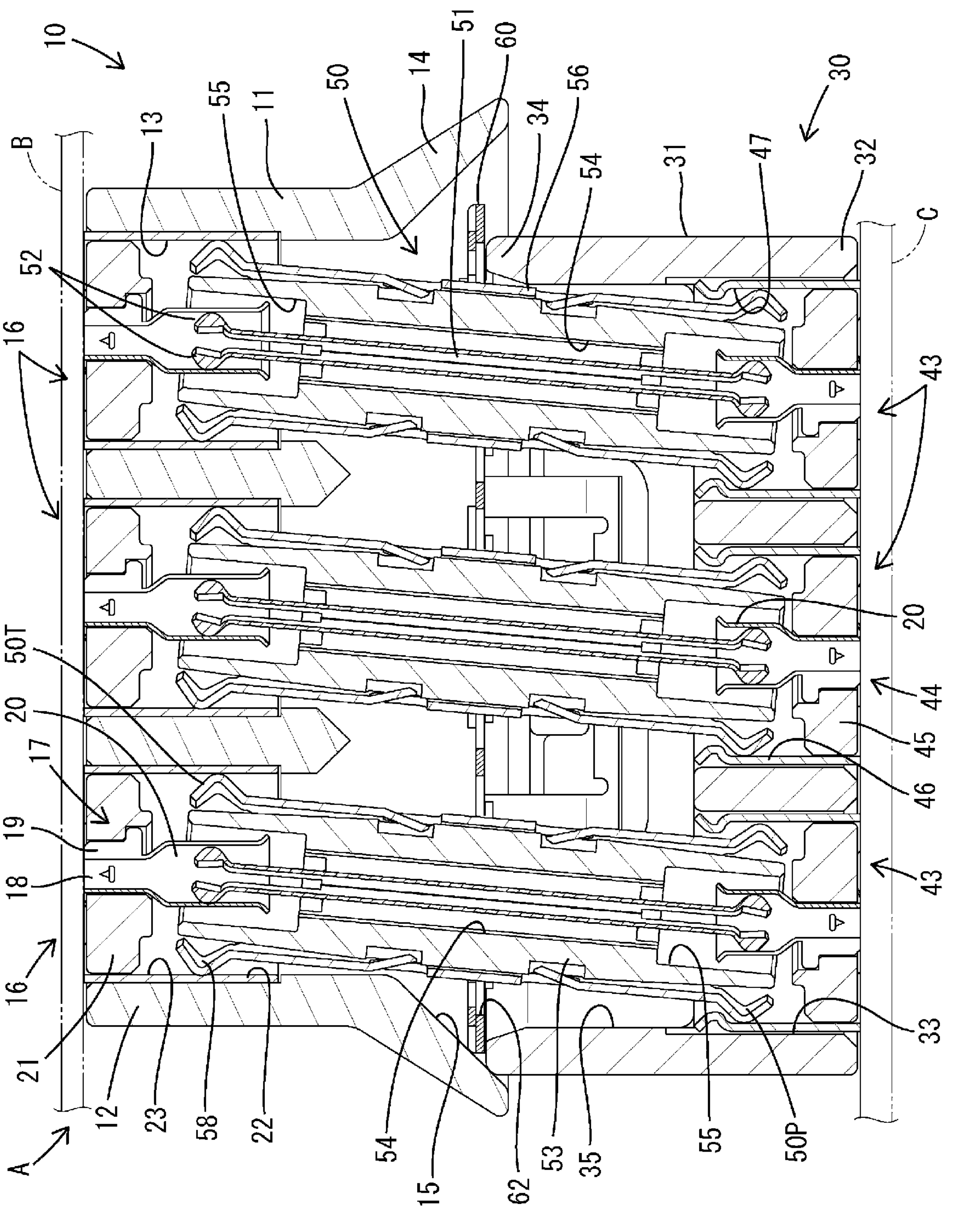
FIG. 7 is a front view in section showing a state where the first and second connectors are connected.

The connector device A of this embodiment includes, as shown in FIG. 7, a first connector 10 to be mounted on a first circuit board B, a second connector 30 to be mounted on a second circuit board C and adaptors 50. The first circuit board B is, for example, provided in a shark fin antenna (not shown) to be mounted on a roof (not shown) of an automotive vehicle. The first circuit board B is horizontally arranged with a mounting surface facing down, i.e. facing the inner side of the vehicle. The second circuit board C is, for example, provided in an ECU mounted in the roof of the automotive vehicle, and horizontally arranged with a mounting surface facing up, i.e. facing toward the shark fin antenna. The first and second circuit boards B, C are arranged in such a positional relationship that the mounting surfaces thereof are facing each other in parallel.

The first and second connectors 10, 30 are electrically conductively connected by bringing the first circuit board B closer to the second circuit board C. By connecting the both connectors 10, 30, the first and second circuit boards B, C are connected without via a wiring harness, and high-speed communication becomes possible between the first and second circuit boards B, C. In a part of the roof of the automotive vehicle where the shark fin antenna is mounted, assembling tolerances between the roof and the shark fin antenna are relatively large. Thus, the first and second circuit boards B, C are possibly positionally deviated in a horizontal direction intersecting a connecting direction of the both connectors 10, 30. In the connector device A of this embodiment, the both connectors 10, 30 are connected while positional deviations of the both circuit boards B, C are absorbed.

As shown in FIG. 7, the first connector 10 includes a first housing 11 and a plurality of first terminal units 16. With the first connector 10 mounted on the first circuit board B, the upper surface of the first housing 11 is fixed to the first circuit board B and upper end parts of the plurality of first terminal units 16 are connected to a printed circuit (not shown) of the first circuit board B. The first housing 11 is a single component made of synthetic resin and including a first terminal holding portion 12 having a rectangular parallelepiped shape, an interference avoiding portion 75 in the form of a rectangular tube and a guiding portion 14 having a rectangular shape.

The first terminal holding portion 12 is formed with a plurality of first terminal accommodation chambers 13 vertically penetrating through the first terminal holding portion 12. The first terminal accommodation chamber 13 is open in a front surface 12S (lower surface) of the first terminal holding portion 12. In a bottom view of the first connector 10, the first terminal accommodation chamber 13 is circular. The plurality of first terminal accommodation chambers 13 are arranged to be aligned in the front-rear direction and the lateral direction.

Tapered guiding surfaces 76 for guiding tip parts 50T of the adaptors 50 to be described later into the first terminal accommodation chambers 13 are formed on opening edge parts of the first terminal accommodation chambers 13 in the front surface 12S of the first terminal holding portion 12. A radius of curvature of the guiding surface 76 in the front surface 12S of the first terminal holding portion 12 is larger than half the interval between adjacent ones of the first terminal accommodation chambers 13. Therefore, partition wall portions 77 partitioning between adjacent ones of the first terminal accommodation chambers 13 are arcuately recessed with respect to the front surface 12S of the first terminal holding portion 12.

The interference avoiding portion 75 projects downward at a right angle to the front surface 12S from the outer peripheral edge of the front surface 12S of the first terminal holding portion 12. The interference avoiding portion 75 is continuous over the entire periphery of the first terminal holding portion 12. In a bottom view, the interference avoiding portion 75 surrounds all of the plurality of first terminal accommodation chambers 13. The inner peripheral surface of the interference avoiding portion 75 is a surface parallel to a facing direction of the first and second connectors 10, 30.

The guiding portion 14 is located below (closer to the second connector 30) the front surface 12S of the first terminal holding portion 12. A base end 14P (upper end) of the guiding portion 14 is continuous over the entire periphery of the lower end edge of the interference avoiding portion 75. The guiding portion 14 is composed of four wall parts inclined obliquely from the lower end edge of the interference avoiding portion 75 to be wider toward the bottom. That is, the guiding portion 14 is tapered from the base end 14P (upper end) to a tip 14T (lower end) thereof.

The guiding portion 14 is continuous over the entire periphery of the first terminal holding portion 12. In a bottom view, the guiding portion 14 surrounds all of the plurality of first terminal accommodation chambers 13. A space in the first housing 11 surrounded by the interference avoiding portion 75 and the guiding portion 14 below the front surface 12S of the first terminal holding portion 12 functions as a first swinging space 15. The first swinging space 15 is open downward of the first housing 11.

Figure 12:
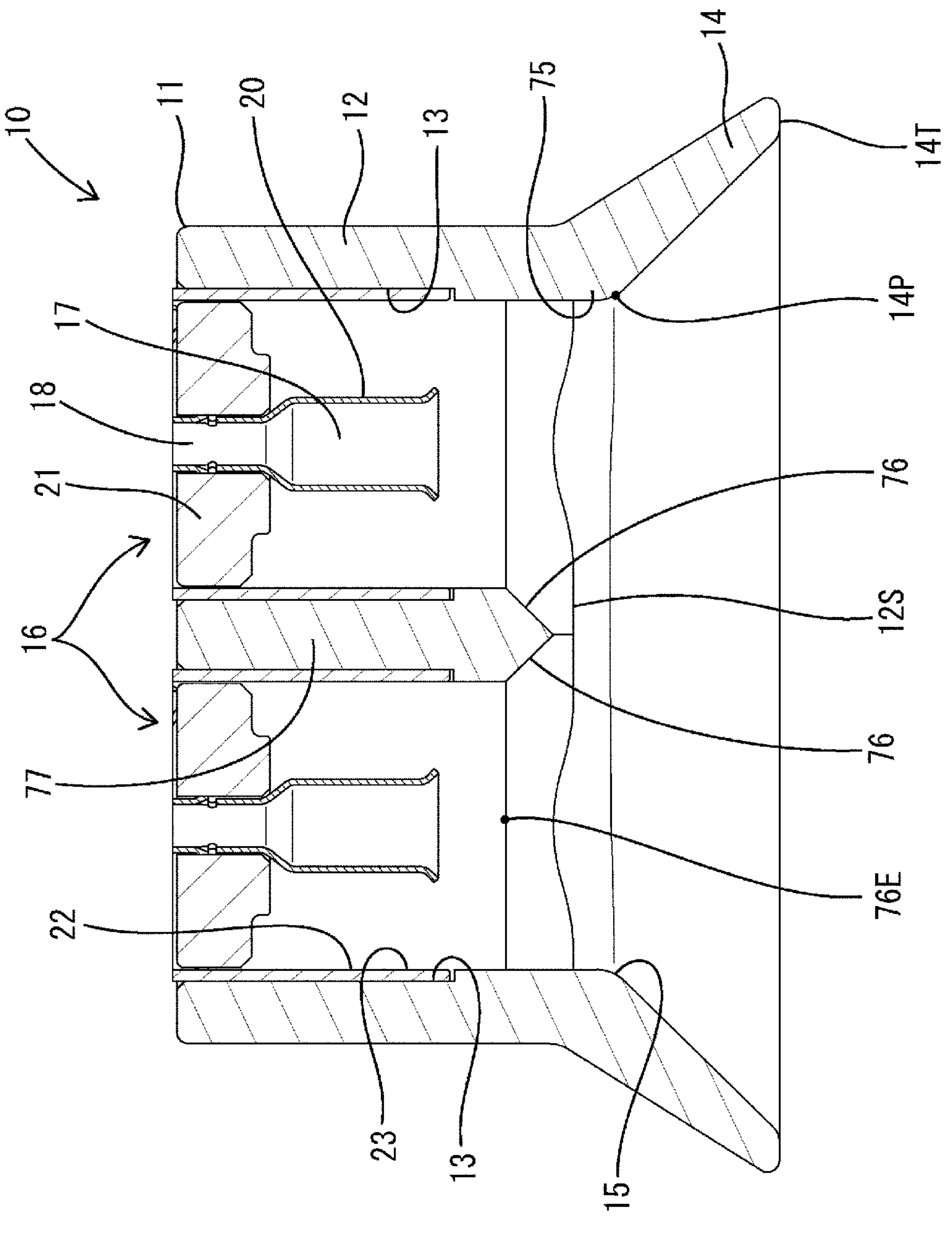
FIG. 12 is a side view in section of the first connector.
Figure 13:
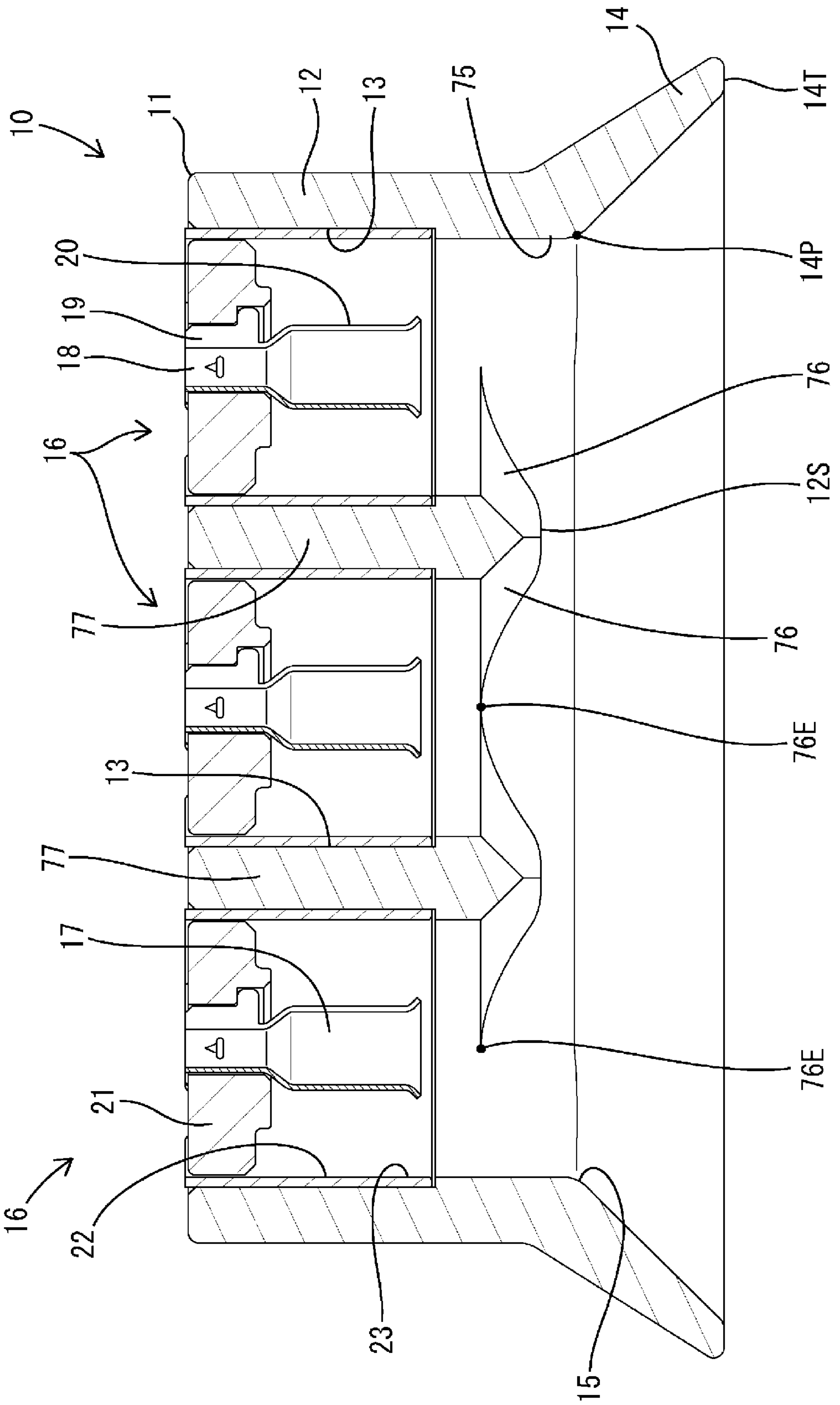
FIG. 13 is a front view in section of the first connector.

The plurality of first terminal units 16 are individually accommodated in the plurality of first terminal accommodation chambers 13. As shown in FIGS. 12 and 13, the first terminal unit 16 includes a first inner conductor 17 made of metal, a first dielectric 21 made of synthetic resin and a first outer conductor 22 made of metal. The first inner conductor 17 has a tubular shape having an axis oriented parallel to the connecting direction of the both connectors 10, 30. The first inner conductor 17 includes a small diameter portion 18, a claw portion 19 radially projecting from the outer periphery of the small diameter portion 18 and a large diameter portion 20 having a larger diameter than the small diameter portion 18. The small diameter portion 18 and the large diameter portion 20 are connected in an axial direction. The first dielectric 21 has a disk shape having a center hole. The first outer conductor 22 has a hollow cylindrical shape having an axis oriented parallel to the first inner conductor 17 and the first dielectric 21.

The first terminal unit 16 is formed such that the small diameter portion 18 of the first inner conductor 17 is coaxially surrounded by the first dielectric 21 and the first inner conductor 17 and the first dielectric 21 are coaxially surrounded by the first outer conductor 22. The first dielectric 21 is located in an upper end part of the first outer conductor 22. A space in the first outer conductor 22 below the first dielectric 21 functions as a connection space 23 open downward. In the connection space 23, the large diameter portion 20 of the first inner conductor 17 projects downward. Each connection space 23 communicates with the swinging space 15. The first inner conductor 17 is arranged only in a region backward (upward) of a back end 76E (upper end) of the guiding surface 76.

As shown in FIG. 2, the second connector 30 includes a second housing 31, as many second terminal units 43 as the first terminal units 16 and as many adaptors 50 as the second terminal units 43. With the second connector 30 mounted on the second circuit board C, the lower surface of the second housing 31 is fixed to the second circuit board C and lower end parts of a plurality of the second terminal units 43 are connected to a printed circuit (not shown) of the second circuit board C. The second housing 31 is a single component made of synthetic resin and including a second terminal holding portion 32 having a rectangular parallelepiped shape, a peripheral wall portion 34 having a rectangular shape and a pair of bilaterally symmetrical holding projections 40.

The second terminal holding portion 32 is formed with as many second terminal accommodation chambers 33 as the second terminal units 43. The second terminal accommodation chambers 33 vertically penetrate through the second terminal holding portion 32. In a plan view of the second connector 30, the second terminal accommodation chamber 33 is circular. A plurality of the second terminal accommodation chambers 33 are arranged to be aligned in the front-rear direction and the lateral direction, similarly to the plurality of first terminal accommodation chambers 13.

As shown in FIG. 2, the peripheral wall portion 34 projects upward in parallel to the connecting direction of the both connectors 10, 30 from the outer peripheral edge of the upper end of the second terminal holding portion 32. In a plan view, the peripheral wall portion 34 surrounds all of the plurality of second terminal accommodation chambers 33. A space of the second housing 31 defined by the peripheral wall portion 34 above the second terminal holding portion 32 functions as a second swinging space 35. The second swinging space 35 is open upward of the second housing 31, i.e. toward the first connector 10. Both left and right side wall portions 36 constituting the peripheral wall portion 34 are formed with cut portions 37. The cut portions 37 are substantially rectangular cuts formed to extend downward from the upper end edges of the side wall portions 36.

Figure 5:
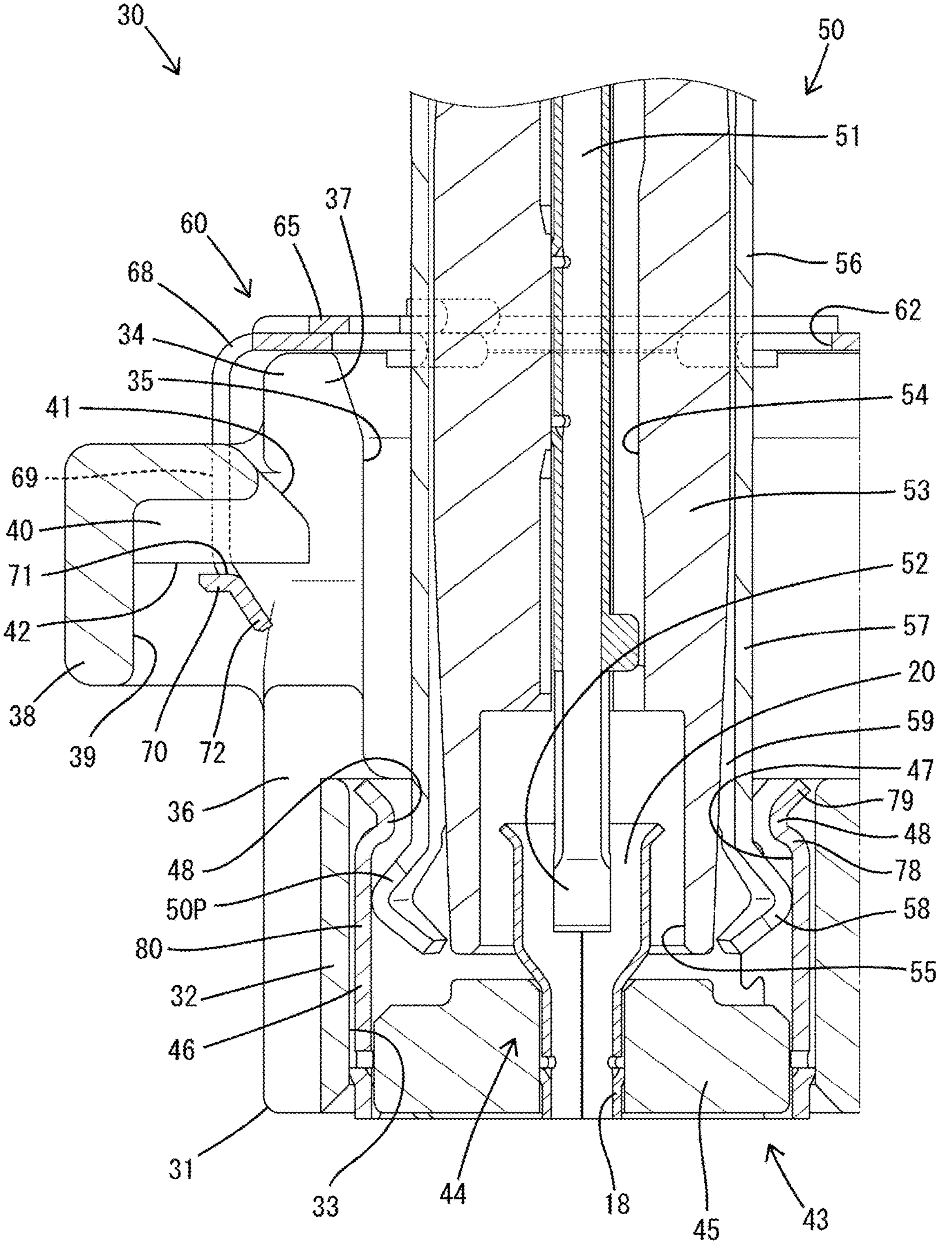
FIG. 5 is a side view in section of the second connector.

Supporting wall portions 38 covering the cut portions 37 from laterally outer sides are formed on the both side wall portions 36. Both front and rear end parts of the supporting wall portion 38 are bent and connected to the outer side surface of the side wall portion 36. A space surrounded by the supporting wall portion 38 functions as a holding space 39 communicating with the second swinging space 35 via the cut portion 37. Holding projections 40 are formed on the inner side surfaces of the both left and right supporting wall portions 38. The holding projection 40 projects into the holding space 39 from a central part in the front-rear direction of the supporting wall portion 38. As shown in FIG. 5, a guide slope 41 inclined downward toward the second swinging space 35 from the side of the supporting wall portion 38 is formed on the upper surface of the holding projection 40. The lower surface of the holding projection 40 functions as a fixed-side facing surface 42 intersecting the connecting direction of the both connectors 10, 30.

Figure 8:
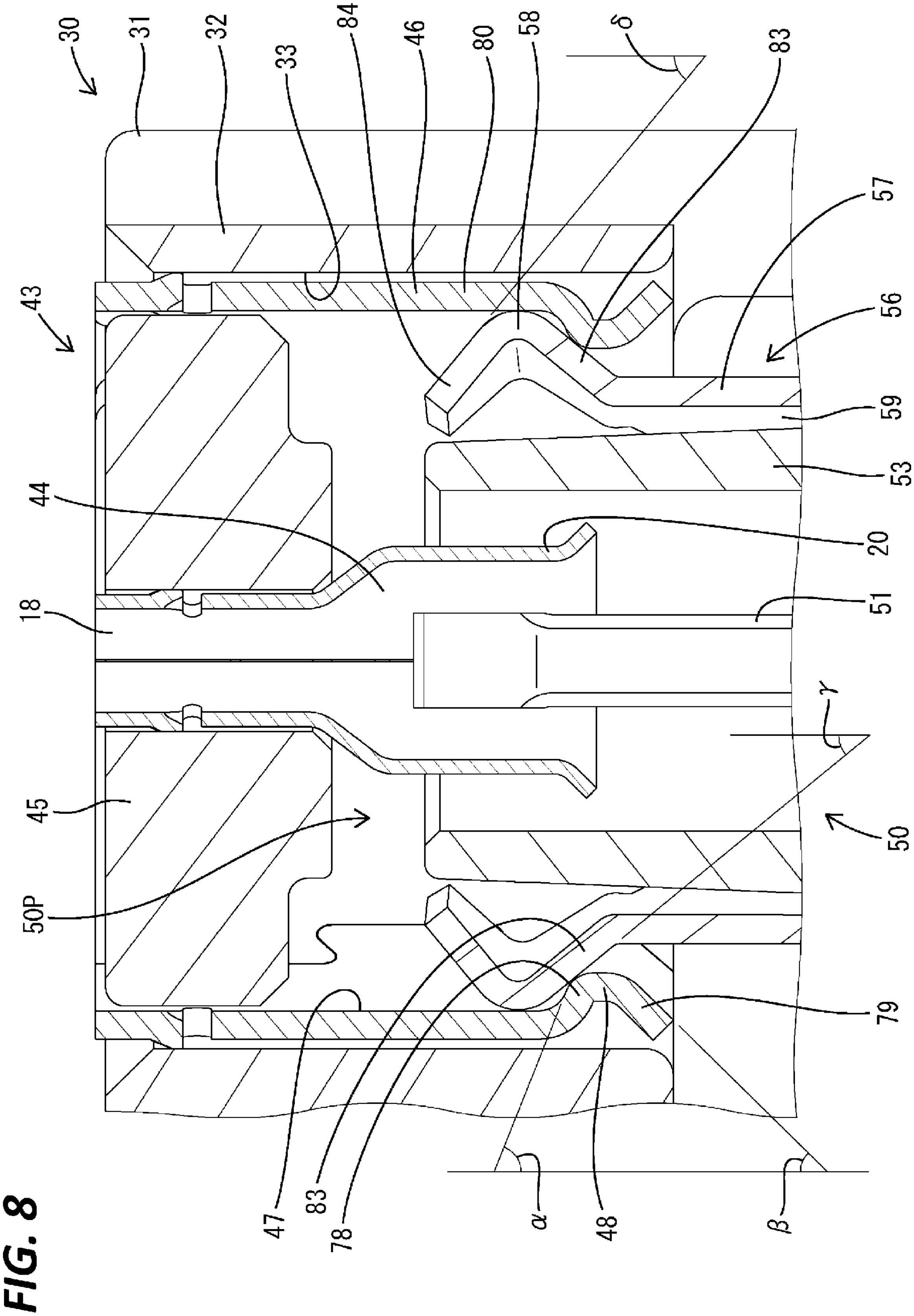
FIG. 8 is a partial enlarged side view in section showing a state where the second connector is arranged on an upper side and the adaptor is held hanging from the second connector.

As shown in FIG. 7, the plurality of second terminal units 43 are individually accommodated in the plurality of second terminal accommodation chambers 33. As shown in FIGS. 5 and 8, the second terminal unit 43 includes a second inner conductor 44 made of metal, a second dielectric 45 made of synthetic resin and a second outer conductor 46 made of metal. The second inner conductor 44 is the same component as the first inner conductor 17 and includes a small diameter portion 18, a claw portion 19 and a large diameter portion 20. The second inner conductor 44 is arranged in an orientation vertically inverted from that of the first inner conductor 17 in an axial direction. The second dielectric 45 is the same component as the first dielectric 21 and arranged in an orientation vertically inverted from that of the first dielectric 21 in the axial direction. The second outer conductor 46 has a hollow cylindrical shape having an axis oriented parallel to the second inner conductor 44 and the second dielectric 45. A contact part of the second terminal unit 43 with the adaptor 50 is vertically symmetrical with a contact part of the first terminal unit 16 with the adaptor 50 except a diameter reduced portion 48.

The second terminal unit 43 is formed such that the small diameter portion 18 of the second inner conductor 44 is coaxially surrounded by the second dielectric 45 and the second inner conductor 44 and the second dielectric 45 are coaxially surrounded by the second outer conductor 46. The second dielectric 45 is located in a lower end part of the second outer conductor 46. A space above the second dielectric 45 in the second outer conductor 46 functions as a supporting space 47 open upward. In the supporting space 47, the large diameter portion 20 of the second inner conductor 44 projects upward. Each supporting space 47 communicates with the second swinging space 35.

The diameter reduced portion 48 continuous over the entire circumference is formed on the inner periphery of an upper end part of the second outer conductor 46. The diameter reduced portion 48 is arranged in the supporting space 47 and shaped to bulge radially inward into a V shape as shown in FIG. 8. The diameter reduced portion 48 includes a receiving portion 78 and a tapered guide portion 79. The receiving portion 78 projects from the upper end edge of the second terminal unit 43 obliquely upward toward an inner peripheral side with respect to the axial direction of the second terminal unit 43 over the entire periphery. The tapered guide portion 79 projects from the projecting end edge of the receiving portion 78 obliquely upward toward an outer peripheral side with respect to the axial direction of the second terminal unit 43 over the entire periphery.

As shown in FIG. 8, an inclination angle $\alpha$ of the receiving portion 78 with respect to the axial direction of the second terminal unit 43 is larger than an inclination angle $\beta$ of the tapered guide portion 79 with respect to the axial direction of the second terminal unit 43. A region of the second outer conductor 46 between the second dielectric 45 and the diameter reduced portion 48 serves as a constant diameter portion 80 parallel to the axial direction of the second terminal unit 43 and having a constant inner diameter in the axial direction.

Figure 9:
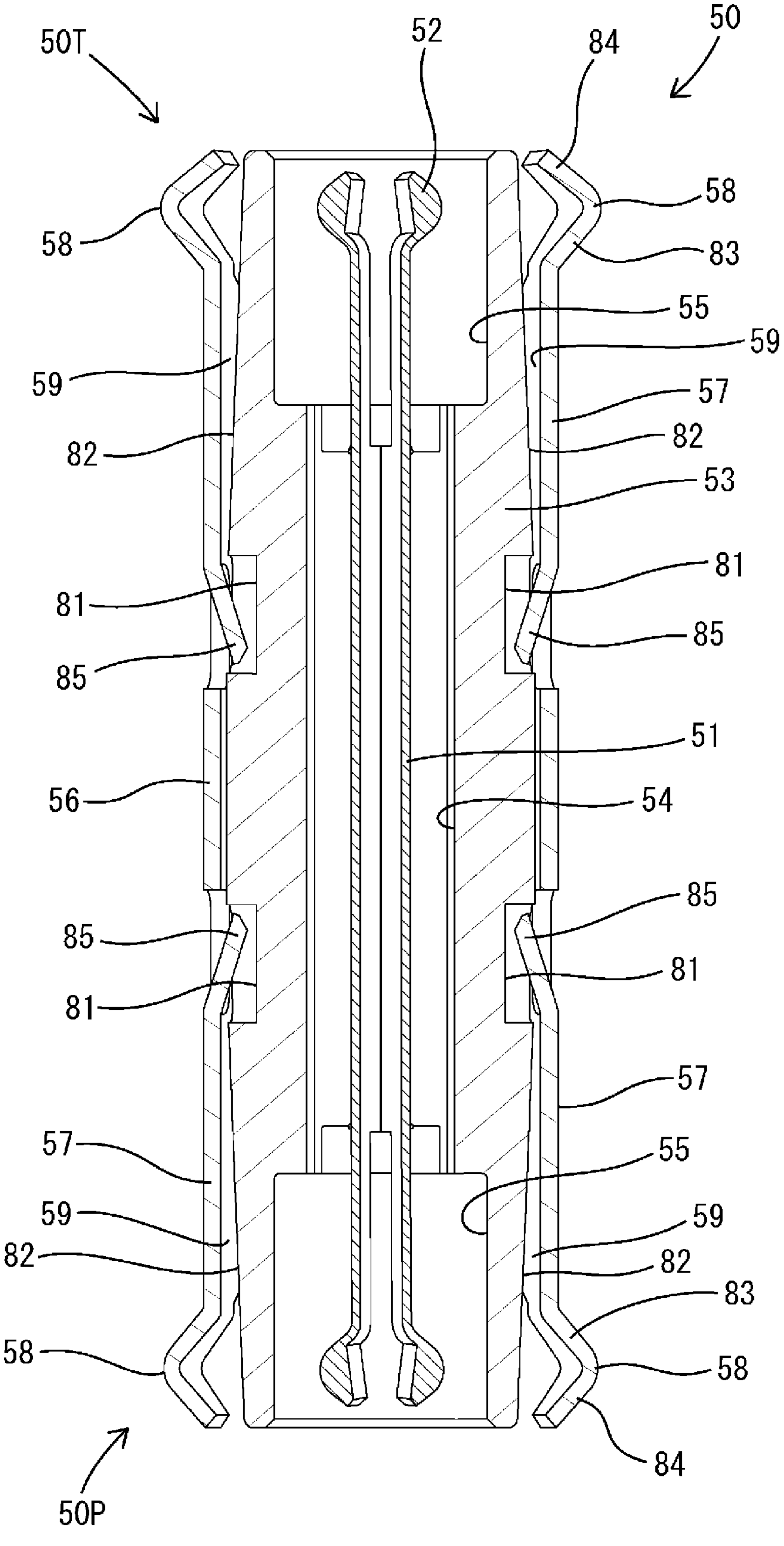
FIG. 9 is a front view in section of the adaptor.

As shown in FIGS. 2 and 9, the adaptor 50 has an elongated shape as a whole. The adaptor 50 is symmetrical to have the same shape when both axial end parts are inverted. As shown in FIG. 9, the adaptor 50 is a member including a movable inner conductor 51 made of metal, a movable dielectric 53 made of synthetic resin and a movable outer conductor 56 made of metal. The adaptor 50 is formed such that the movable inner conductor 51 is inserted in an insertion hole 54 of the movable dielectric 53 and the movable outer conductor 56 is fit on the outer periphery of the movable dielectric 53. A base end part 50P and the tip part 50T, which are both axial end parts of the adaptor 50, function as a pair of connecting end parts connectable to the first and second terminal units 16, 43. The end surfaces of the movable dielectric 53 are exposed on the end surface of the base end part 50P and that of the tip part 50T. A pair of resilient claw pieces 52 resiliently deformable in a radial direction are formed on each of both axial end parts of the movable inner conductor 51.

The movable dielectric 53 is made of synthetic resin and has a hollow cylindrical shape coaxial with an axis of the adaptor 50. The insertion hole 54 coaxially penetrating through the movable dielectric 53 is formed in a central part of the movable dielectric 53. Circular accommodation recesses 55 are formed in both axial end parts of the movable dielectric 53 by coaxially recessing both end surfaces of the movable dielectric 53. The accommodation recesses 55 are spaces constituting both axial end parts of the insertion hole 54. Inner diameters of the accommodation recesses 55 are larger than that of the insertion hole 54. The resilient claw pieces 52 of the movable inner conductor 51 are accommodated in the accommodation recesses 55.

A plurality of pairs of locking grooves 81 are formed at equal angular intervals in a circumferential direction in the outer periphery of the movable dielectric 53. The paired locking grooves 81 are arranged at positions separated in an axial direction of the movable dielectric 53. Tapered slide contact surfaces 82 are formed in regions on sides closer to the base end part 50P and the tip part 50T than the locking grooves 81 on the outer peripheral surface of the movable dielectric 53. The tapered slide contact surfaces 82 gradually reduce a diameter from a center toward the end parts in the axial direction of the movable dielectric 53. The tapered slide contact surface 82 on the side of the base end part 50P is inclined to gradually expand a clearance to the inner peripheral surface of the movable outer conductor 56 from the axial center toward the base end part 50P. The tapered slide contact surface 82 on the side of the tip part 50T is inclined to gradually expand a clearance to the inner peripheral surface of the movable outer conductor 56 from the axial center toward the tip part 50T.

The movable outer conductor 56 has a hollow cylindrical shape as a whole. A plurality of pairs of resilient arm portions 57 disposed at intervals in the circumferential direction are formed on both axial end parts of the movable outer conductor 56. The paired resilient arm portions 57 are arranged at positions separated in an axial direction of the adaptor 50. The resilient arm portion 57 is cantilevered toward the axial end part and resiliently deformable in a radial direction. The resilient arm portion 57 is arranged at a position facing the tapered slide contact surface 82. A space between the tapered slide contact surface 82 and the resilient arm portion 57 functions as a deflection space 59 for resiliently displacing the resilient arm portion 57 radially inward.

A diameter expanded portion 58 is formed on an extending end part of the resilient arm portion 57. The diameter expanded portion 58 is shaped to bulge radially outward into a V shape. The diameter expanded portion 58 includes a hooking portion 83 and a tapered slide contact portion 84. The hooking portion 83 projects obliquely toward an outer peripheral side with respect to the axial direction of the adaptor 50. The tapered slide contact portion 84 projects obliquely from the projecting end edge of the hooking portion 83 toward an inner peripheral side with respect to the axial direction of the adaptor 50. An inclination angle $\gamma$ of the hooking portion 83 with respect to the axial direction of the adaptor 50 is smaller than the inclination angle $\alpha$ of the receiving portion 78 with respect to the axial direction of the second terminal unit 43. An inclination angle $\delta$ of the tapered slide contact portion 84 with respect to the axial direction of the adaptor 50 is equal to the inclination angle $\beta$ of the tapered guide portion 79 with respect to the axial direction of the second terminal unit 43.

The movable outer conductor 56 is formed with a plurality of pairs of locking claws 85. The locking claw 85 is formed by partially cutting and raising the movable outer conductor 56 and resiliently deformable in the radial direction. The plurality of pairs of locking claws 85 are arranged at the same intervals as the locking grooves 81 in the circumferential direction. The paired locking claws 85 are at positions separated in the axial direction of the adaptor 50. The locking claw 85 on the side of the base end part 50P projects obliquely inward toward the tip part 50T. The locking claw 85 on the side of the tip part 50T projects obliquely inward toward the base end part 50P. The locking claws 85 are arranged in a region closer to a center than the resilient arm portions 57 in the axial direction of the adaptor 50. If the movable outer conductor 56 and the movable dielectric 53 are assembled, the locking claws 85 are locked in the locking grooves 81, whereby the movable dielectric 53 and the movable outer conductor 56 are held in an assembled state.

The base end part 50P, which is one axial end part of the adaptor 50, is attached to the second terminal unit 43 while being inserted in the supporting space 47 of the second terminal unit 43. In the process of connecting the base end part 50P to the second terminal unit 43, the tapered slide contact portions 84 of the adaptor 50 slide in contact with the tapered guide portion 79 of the second terminal unit 43, whereby the resilient arm portions 57 are temporarily resiliently deformed into the deflection spaces 59. When the diameter expanded portions 58 pass through the diameter reduced portion 48, the resilient arm portions 57 resiliently return and bent parts of the diameter expanded portions 58 where the hooking portions 83 and the tapered slide contact portions 84 are connected resiliently contact the inner peripheral surface of the constant diameter portion 80 of the second outer conductor 46.

If the resilient arm portions 57 resiliently return and the movable outer conductor 56 and the second outer conductor 46 contact, the hooking portions 83 of the diameter expanded portions 58 are locked to the receiving portion 78 of the diameter reduced portion 48 in the axial direction. By this locking action, the separation of the adaptor 50 from the second terminal unit 43 is restricted. Even if the adaptor 50 is vertically inverted to project downward from the second terminal unit 43, a locked state of the diameter expanded portions 58 and the diameter reduced portion 48 is maintained. The adaptors 50 are individually swingable with contact parts of the base end parts 50P and the second terminal units 43 as fulcrums. Even if the adaptor 50 swings in the front-rear direction or lateral direction with respect to the second terminal unit 43, the locked state of the diameter expanded portions 58 and the diameter reduced portion 48 is maintained. With the base end part 50P attached to the second terminal unit 43, the large diameter portion 20 of the second inner conductor 44 is accommodated in the accommodation recess 55 and the resilient claw pieces 52 of the movable inner conductor 51 resiliently contact the inner periphery of the large diameter portion 20 of the second inner conductor 44.

The adaptor 50 attached to the second terminal unit 43 projects upward from the second housing 31. The tip part 50T of the adaptor 50 is connected to the first terminal unit 16. Here, since one adaptor 50 is supported in contact with only one second terminal unity 43, each of the plurality of adaptors 50 can individually swing in a direction different from the other adaptors 50. However, in a state where the plurality of adaptors 50 swing in mutually different directions, the tip parts 50T of the plurality of adaptors 50 cannot be simultaneously connected to the plurality of first terminal units 16 when the first and second connectors 10, 30 are connected.

As a measure against that, the second connector 30 is provided with an alignment member 60. The alignment member 60 is a single component formed from a metal plate material. As shown in FIG. 3, the alignment member 60 includes a plate-like body portion 61 and a pair of bilaterally symmetrical resilient holding pieces 68. The plate-like body portion 61 is a flat plate having a plate thickness direction oriented parallel to the connecting direction of the both connector 10, 30. The plate-like body portion 61 has the same shape as the peripheral wall portion 34 of the second housing 31 in a plan view.

The plate-like body portion 61 is formed with a plurality of hole portions 62 in the same arrangement as the plurality of second terminal units 43 in a plan view. The hole portion 62 has a circular shape having an inner diameter larger than an outer diameter of the movable outer conductor 56, and vertically penetrates through the plate-like body portion 61. A plurality of fixed projections 63 spaced apart in a circumferential direction are formed on the inner periphery of the hole portion 62. The fixed projections 63 are formed by closely bending tip parts of extending parts extending toward a radial center from the inner periphery of the hole portion 62 so that the tip parts are folded downward.

Figure 10:
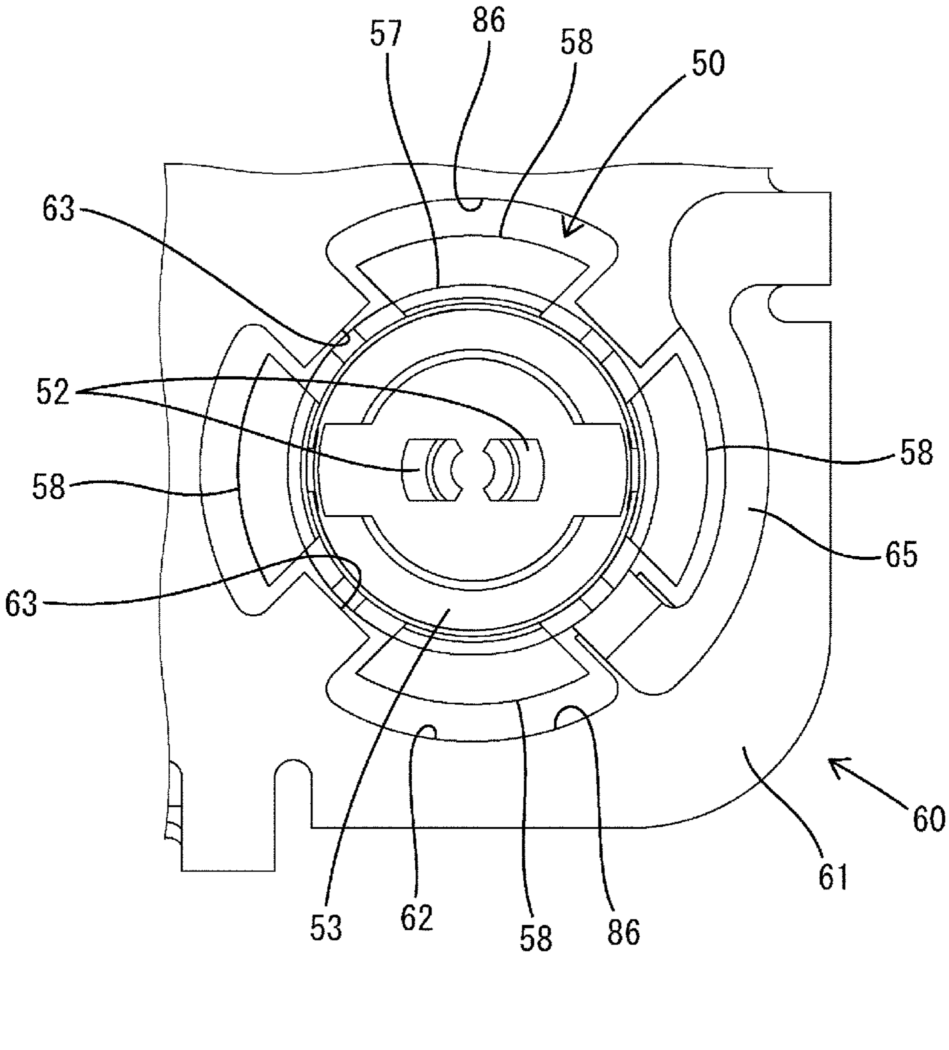
FIG. 10 is a partial enlarged plan view showing a state where the adaptor and a hole portion of the alignment member are coaxially arranged.
Figure 11:
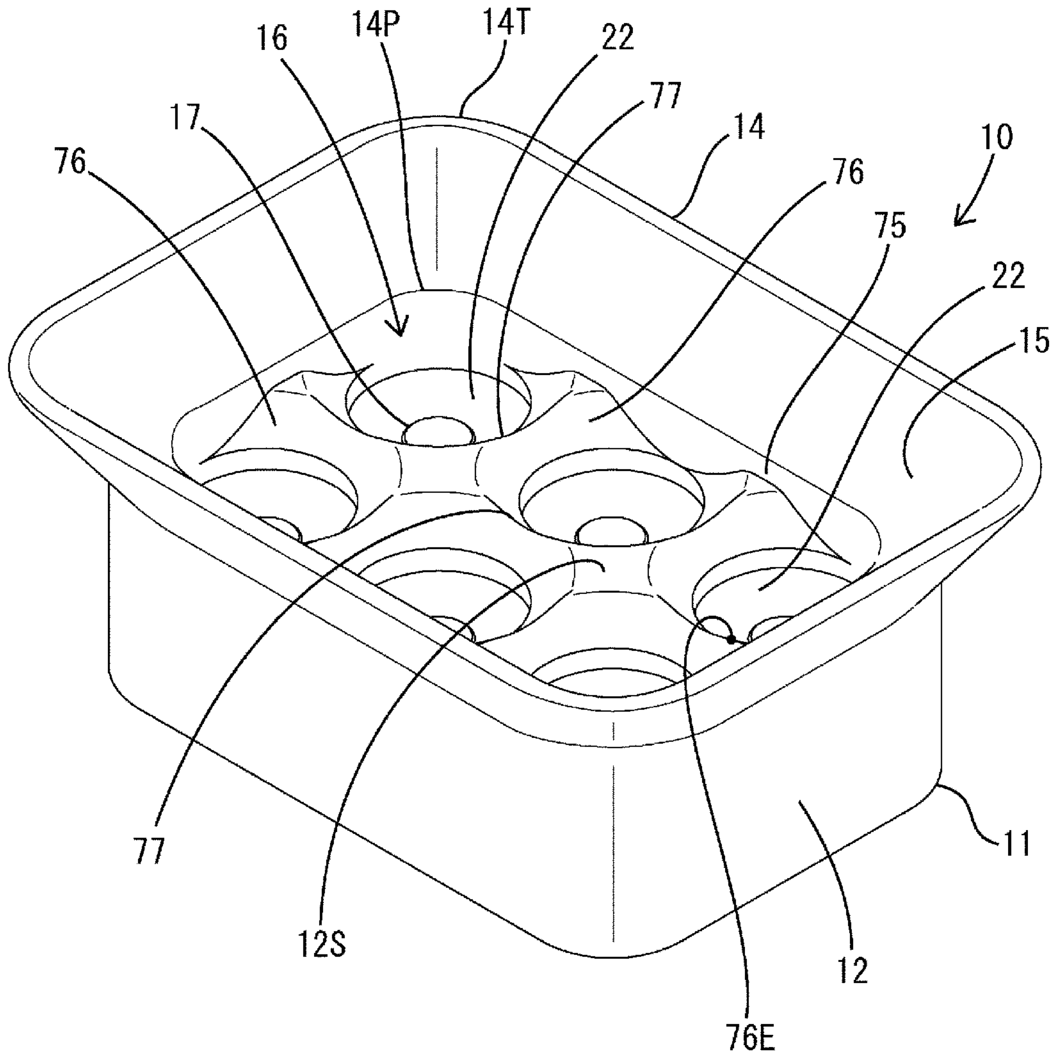
FIG. 11 is a perspective view showing a vertically inverted state of the first connector.

The outer peripheral surface of the projecting end part of the fixed projection 63 functions as a fixed contact portion 64 in the form of a semicircular curved surface. The entire region of the fixed contact portion 64 is formed only by a non-fracture surface different from a fracture surface produced by press working, out of surfaces of the alignment member 60. A diameter of an inscribed circle internally tangent to the projecting ends of the plurality of fixed projections 63, i.e. the plurality of fixed contact portions 64, is equal to or slightly larger than the outer diameter of the movable outer conductor 56. As shown in FIG. 10, escaping recesses 86 are formed between the fixed projections 63 adjacent in the circumferential direction. A diameter of a virtual circle (not shown) defined by the escaping recesses 86 is larger than a diameter of a virtual circle (not shown) tangent to the diameter expanded portions 58 of the resilient arm portions 57.

The plate-like body portion 61 is integrally formed with a plurality of resilient contact pieces 65 disposed to overlap on the upper surface of the plate-like body portion 61. The resilient contact piece 65 has an arcuate shape in a plan view. One resilient contact piece 65 is cantilevered along an opening edge of one hole portion 62 with the outer peripheral edge of the plate-like body portion 61 as a base point. A movable projection 66 is formed on an extending end part of the resilient contact piece 65. The movable projection 66 is formed by closely bending a tip part of an extending part extending toward the radial center from the inner periphery of the extending end part of the resilient contact piece 65 so that the tip part is folded upward. The outer peripheral surface of the projecting end part of the movable projection 66 functions as a movable contact portion 67 in the form of a semicircular curved surface. The entire region of the movable contact portion 67 is formed only by a non-fracture surface, similarly to the fixed contact portion 64.

Figure 6:
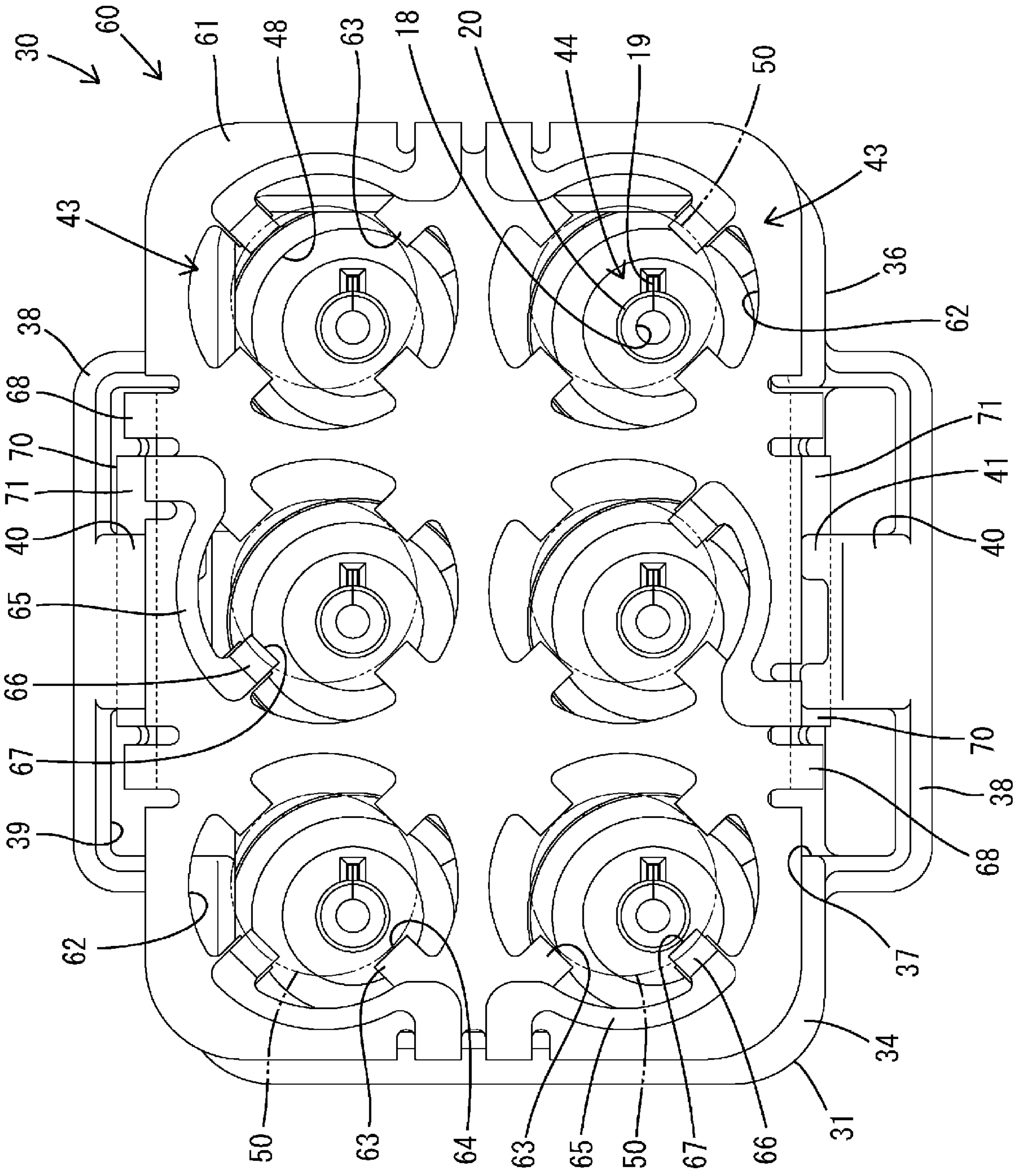
FIG. 6 is a plan view showing a state where the alignment member is removed in the second connector.

As shown in FIG. 3, the resilient holding piece 68 includes a pair of front and rear leg portions 69 extending downward at a right angle to the plate-like body portion 61 from a side edge of the plate-like body portion 61 and a locking portion 70 coupling the extending ends of the both leg portions 69. The locking portion 70 is in the form of a plate parallel to the plate-like body portion 61. As shown in FIGS. 3 and 6, the upper surface of the locking portion 70 serves as a movable-side facing surface 71. The movable-side facing surface 71 faces the fixed-side facing surface 42 in the vertical direction parallel to the connecting direction of the both connectors 10, 30. The resilient holding piece 68 is formed with a guided portion 72 protruding obliquely downward from the inner side edge of the locking portion 70.

The alignment member 60 is mounted on the second housing 31 by being brought closer to the second housing 31 from above. In the process of mounting the alignment member 60 on the second housing 31, a pair of the guided portions 72 slide in contact with a pair of the guide slopes 41, whereby the pair of resilient holding pieces 68 are resiliently deformed in directions toward each other. If the guided portions 72 and the locking portions 70 pass through the holding projections 40, the pair of resilient holding pieces 68 resiliently return and are accommodated into the holding spaces 39. The movable-side facing surfaces 71 of the resilient holding pieces 68 face the fixed-side facing surfaces 42 of the second housing 31 from below. In the above way, the assembling of the alignment member 60 with the second housing 31 is completed.

With the alignment member 60 mounted on the second housing 31, an outer peripheral edge part of the plate-like body portion 61 is placed on the upper end surface of the peripheral wall portion 34, the leg portions 69 and the locking portions 70 are accommodated in the holding spaces 39, and the locking portions 70 creep under the holding projections 40. By locking the locking portions 70 to the holding projections 40, the separation of the alignment member 60 from the second housing 31 is restricted. With the outer peripheral edge of the plate-like body portion 61 aligned with the peripheral wall portion 34, clearances are secured between the leg portions 69 and the supporting wall portions 38 and between the locking portions 70 and the supporting wall portions 38.

Accordingly, the alignment member 60 is held on the second housing 31 with a relative displacement in a direction parallel to the plate-like body portion 61 allowed. The direction parallel to the plate-like body portion 61 is a direction which intersects perpendicularly to the connecting direction of the both connectors 10, 30 and in which positional deviations of the both circuit boards B, C are assumed. A relative displacement amount of the alignment member 60 with respect to the second housing 31 reaches its maximum when the leg portions 69 or the locking portions 70 come into contact with the supporting wall portions 38. With the relative displacement amount of the alignment member 60 maximized, a positional relationship in which at least parts of the movable-side facing surfaces 71 vertically face at least parts of the fixed-side facing surfaces 42 is maintained. Therefore, even if the displacement amount of the alignment member 60 is maximum, the alignment member 60 is kept mounted on the second housing 31.

After the alignment member 60 is mounted on the second housing 31, the plurality of adaptors 50 are attached to the second terminal units 43. In attaching the adaptor 50, the base end part 50P of the adaptor 50 is inserted into the second swinging space 35 through the hole portion 62 and fit into the supporting space 47 of the second terminal unit 43. The alignment member 60 may be mounted on the second housing 31 after the adaptors 50 are attached to the second terminal units 43. As shown in FIG. 10, when the tip part 50T of the adaptor 50 passes through the hole portion 62, the diameter expanded portions 58 of the resilient arm portions 57 pass through the escaping recesses 86. Thus, the diameter expanded portions 58 do not interfere with the alignment member 60.

With the adaptors 50 and the alignment member 60 mounted in the second housing 31, the outer peripheries of the movable outer conductors 56 are surrounded over the entire circumference by hole edge parts of the hole portions 62. Since the fixed contact portions 64 and the movable contact portions 67 are in contact with the outer peripheries of the movable outer conductors 56, the adaptors 50 are held in the alignment member 60 with relative displacements in directions parallel to the plate-like body portion 61 restricted. Since the alignment member 60 is electrically conductive, if the fixed contact portions 64 and the movable contact portions 67 contact the outer peripheries of the movable outer conductors 56, the alignment member 60 and the plurality of adaptors 50 are electrically conductively connected.

The alignment member 60 is in contact with the movable outer conductor 56 in a region between the resilient arm portions 57 on the side of the base end part 50P and the resilient arm portions 57 on the side of the tip part 50P in the axial direction of the adaptor 50. Therefore, neither the fixed contact portions 64 nor the movable contact portions 67 are in contact with the resilient arm portions 57. In this way, the damage and deformation of the resilient arm portions 57 are prevented.

By restricting a relative displacement of each adaptor 50 with respect to the alignment member 60, relative displacements among the adaptors 50 are restricted by the alignment member 60. When an external force in a swinging direction is applied to any one of the adaptor 50, all the adaptors 50 swing by the same angle and in the same direction at once, integrally with the alignment member 60. Thus, the tip parts 50T of all the adaptors 50 are maintained in a fixed positional relationship regardless of the swinging direction and the swing angle of the adaptors 50. The maintained positional relationship is the same as the arrangement of the plurality of first terminal units 16. The adaptor 50 swings with the connected part of the second terminal unit 43 and the base end part 50P of the adaptor 50 as a fulcrum. The swing angle of the adaptor 50 reaches its maximum when the adaptor 50 comes into contact with the peripheral wall portion 34. That is, if the adaptor 50 comes into contact with the peripheral wall portion 34, the inclination of the adaptor 50 is restricted.

A displacement amount of the alignment member 60 when the adaptor 50 is inclined becomes larger as a contact position of the alignment member 60 gets closer to the tip part 50T of the adaptor 50. A pressing force generated between the adaptor 50 and the alignment member 60 when the adaptor 50 sliding in contact with the guiding portion 14 pushes the alignment member 60 in a horizontal direction increases as the contact position of the alignment member 60 gets closer to the base end part 50P of the adaptor 50. Since the contact position of the alignment member 60 is an intermediate position between the base end part 50P and the tip part 50T in this embodiment, the pressing force generated between the adaptor 50 and the alignment member 60 can be reduced while the displacement amount of the alignment member 60 when the adaptor 50 is inclined is suppressed.

If the first and second circuit boards B, C are relatively displaced when the first and second connectors 10, 30 are connected, the tip part 50T of any one of the adaptors 50 comes into contact with the inner surface of the guiding portion 14. If the both connectors 10, 30 are further connected from this state, the tip part 50T of the adaptor 50 slides in contact with the inclined inner surface of the guiding portion 14, whereby the tip parts 50T of all the adaptors 50 are guided to connection positions to the first terminal units 16 while changing the swing angles at once. During this time, the base end parts 50P of the adaptors 50 swing in the second swinging space 35 and the tip parts 50T of the adaptors 50 swing in the first swinging space 15.

The farthest tip of the tip part 50T projects more toward the first terminal unit 16 than the projecting ends of the hooking portions 83, which are contact points of the diameter expanded portions 58 with the guiding portion 14. Thus, in the process of the guiding portion 14 to guide the tip part 50T, a part of the tip part 50T advances more upward (toward the first terminal holding portion 12) than the base end 14P of the guiding portion 14 before the diameter expanded portions 58 reach the base end 14P of the guiding portion 14. Particularly, if the first and second connectors 10, 30 are positionally deviated on a horizontal plane perpendicular to the facing direction of the both connectors 10, 30, the tip surface of the tip part 50 becomes oblique to the front surface 12S of the first terminal holding portion 12, wherefore an advance amount of the tip part 50T increases.

However, since the front surface 12S of the first terminal holding portion 12 is located above the base end 14P of the guiding portion 14, the tip parts 50T do not interfere with the front surface 12S of the first terminal holding portion 12. Therefore, the tip parts 50T do not interfere with the front surface 12S of the first terminal holding portion 12 and the diameter expanded portions 58 can reach the base end 14P of the guiding portion 14. When the diameter expanded portions 58 reach the base end 14P of the guiding portion 14, centers of the tip parts 50T approach axes of the first terminal units 16 in a plan view.

Thereafter, if the connection of the tip parts 50T and the first terminal units 16 proceeds, the diameter expanded portions 58 slide in contact with the guiding surfaces 76, whereby the centers of the tip parts 50T are arranged coaxially with the first terminal units 16. If the connection of the tip parts 50T and the first terminal units 16 further proceeds, the diameter expanded portions 58 resiliently contact the inner peripheral surfaces of the first outer conductors 22 and the movable inner conductors 51 resiliently contact the first inner conductors 17. If the tip parts 50T of the adaptors 50 are connected to the first terminal units 16 as described above, the first and second connectors 10, 30 are properly connected. When the both connectors 10, 30 are properly connected, the first and second circuit boards B, C are connected via the first terminal units 16, the alignment member 60 and the second terminal units 43.

The movable inner conductor 51 is inserted in the insertion hole 54 of the movable dielectric 53 with a clearance formed therebetween. Accordingly, the movable inner conductor 51 can be relatively displaced to incline an axis with respect to the movable dielectric 53 and the movable outer conductor 56. In this way, a good contact state of the movable inner conductor 51 with the first and second inner conductors 17, 44 and a good contact state of the movable outer conductor 56 with the first and second outer conductors 22, 46 can be combined regardless of the swing angle even if the adaptor 50 swings and an axis of the adaptor 50 is inclined with respect to those of the first and second terminal units 16, 43.

The connector device A of this embodiment includes the first connector 10, the second connector 30 and the adaptors 50. The first connector 10 includes the plurality of first terminal units 16 and is mounted on the first circuit board B. The second connector 30 includes the plurality of second terminal units 43 and is mounted on the second circuit board C. The adaptor 50 includes the base end part 50P and the tip part 50T functioning as a pair of connecting end parts.

The first and second terminal units 16, 43 include the first and second inner conductors 17, 24 serving as contact portions symmetrical with each other, and the first and second outer conductors 22, 46 serving as contact portions symmetrical with each other. The base end part 50P and the tip part 50T of the adaptor 50 can contact the first inner conductor 17, the first outer conductor 22, the second inner conductor 44 and the second outer conductor 46. The base end part 50P and the tip part 50T are symmetrical with respect to a facing direction of the first and second terminal units 16, 43.

According to this configuration, since the base end part 50P and the tip part 50T of the adaptor 50 are symmetrical, the orientation of the adaptor 50 needs not be confirmed in connecting the adaptor 50 to the first or second terminal unit 16, 43. That is, the base end part 50P can contact either of the first and second terminal units 16, 43, and the tip part 50T can also contact either of the first and second terminal units 16, 43. Therefore, the connector device A of this embodiment is excellent in workability at the time of assembling.

The adaptor 50 includes the movable inner conductor 51, the movable dielectric 53 for accommodating the movable inner conductor 51 and the movable outer conductor 56 surrounding the movable dielectric 53. The movable dielectric 53 is exposed on the end surfaces of the base end part 50P and the tip part 50T. According to this configuration, workability is good since the exposed surface of the movable dielectric 53 can be pushed in connecting the base end part 50P or the tip part 50T to the first terminal unit 16 or the second terminal unit 43.

At least the pair of locking grooves 81 spaced apart in the axial direction are formed in the outer periphery of the movable dielectric 53. The movable outer conductor 56 is formed with at least the pair of locking claws 85 spaced apart in the axial direction. The locking claws 85 project obliquely toward the inner peripheral side and are resiliently deformable in the radial direction. In the process of assembling the movable outer conductor 56 with the movable dielectric 53, the locking claws 85 slide in contact with the outer peripheral surface of the movable dielectric 53 while being resiliently deformed. If the movable outer conductor 56 is properly assembled with the movable dielectric 53, the resiliently restored locking claws 85 are locked in the locking grooves 81, thereby restricting relative displacements of the movable dielectric 53 and the movable outer conductor 56 in the axial direction. In this way, the movable dielectric 53 and the movable outer conductor 56 are held in the assembled state.

The pair of locking claws 85 are formed at two positions spaced apart in the axial direction and each thereof projects in an oblique direction toward the mating locking claw 85. According to this configuration, in the process of assembling the movable outer conductor 56 with the movable dielectric 53, the locking claw 85 on a front side in an assembling direction passes through the locking groove 81 on a rear side (near side) in the assembling direction. If the movable outer conductor 56 is properly assembled with the movable dielectric 53, the pair of locking claws 85 resiliently return and are individually locked in the pair of locking grooves 81. Since the pair of locking claws 85 are locked to the movable dielectric 53 in directions opposite to each other, the movable outer conductor 56 and the movable dielectric 53 are restricted from being relatively displaced in either of forward and reverse directions along the axis direction.

The tapered slide contact surfaces 82 inclined to gradually increase the clearance to the inner peripheral surface of the movable outer conductor 56 from the central part in the axial direction of the movable dielectric 53 toward the base end part 50P and the tapered slide contact surfaces 82 inclined to gradually increase the clearance to the inner peripheral surface of the movable outer conductor 56 from the central part in the axial direction of the movable dielectric 53 toward the tip part 50T are formed on the outer peripheral surface of the dielectric 53. According to this configuration, since the locking claws 85 slide in contact with the tapered slide contact surfaces 82 in the process of assembling the movable outer conductor 56 with the movable dielectric 53, the projecting ends of the locking claws 85 are not caught on the outer peripheral surface of the movable dielectric 53. The locking claws 85 are formed in the regions different from the resilient arm portions 57 in the axial direction of the adaptor 50. According to this configuration, since the rigidity of the resilient arm portions 57 is not reduced by forming the locking claws 85, the connection reliability of the resilient arm portions 57 with the first and second terminal units 16, 43 is high.

The movable outer conductor 56 includes the resilient arm portions 57 to be connected to the first or second terminal units 16, 43 while being resiliently displaced toward the inner peripheral side. The resilient arm portions 57 are disposed in the regions facing the tapered slide contact surfaces 82. According to this configuration, the spaces between the tapered slide contact surfaces 82 and the resilient arm portions 57 function as the deflection spaces 59 for allowing resilient displacements of the resilient arm portions 57, wherefore the outer diameter of the movable outer conductor 56 can be suppressed small The base end part 50P and the tip part 50T of the adaptor 50 are formed with the hooking portions 83 radially projecting from the movable outer conductor 56. The second terminal unit 43 is formed with the receiving portion 78 for holding the adaptor 50 in the second connector 30 by being locked to the hooking portions 83. According to this configuration, the adaptor 50 can be held hanging from the second connector 30 by locking the hooking portions 83 to the receiving portion 78. Therefore, the adaptors 50 need not be supported with hand until the adaptors 50 and the first connector 10 are connected. Therefore, workability is good.

The diameter reduced portion 48 of the second terminal unit 43 includes the tapered guide portion 79 for guiding the base end part 50P to the receiving portion 78 to achieve a locked state. The inclination angle $\alpha$ of the receiving portion 78 with respect to the connecting direction of the second terminal unit 43 and the base end part 50P is larger than the inclination angle $\beta$ of the tapered guide portion 79 with respect to the connecting direction of the second terminal unit 43 and the tip part 50T. According to this configuration, the locking function of the hooking portions 83 and the receiving portion 78 can be enhanced while a resistance generated when the base end part 50P is guided to the receiving portion 78 to achieve the locked state is reduced.

The movable outer conductor 56 in the base end part 50P is formed with the tapered slide contact portions 84 configured to slide in contact with the tapered guide portion 79 in the process of locking the hooking portions 83 to the receiving portion 78. The inclination angle $\delta$ of the tapered slide contact portion 84 with respect to the connecting direction of the second terminal unit 43 and the base end part 50P is equal to the inclination angle $\beta$ of the tapered guide portion 79 with respect to the connecting direction of the second terminal unit 43 and the base end part 50P. According to this configuration, since the tapered slide contact portion 84 is guided while being held in surface contact with the tapered guide portion 79, the tapered slide contact portion 84 is not caught on the tapered guide portion 79 and the reliability of a guide function is excellent.

The receiving portion 78 projects radially inward from the inner periphery of the second terminal unit 43. The base end part 50P includes the resilient arm portions 57. The hooking portions 83 project further radially outward than the resilient arm portions 57. The projecting ends of the hooking portions 83 resiliently contact the inner periphery of the second terminal unit 43. According to this configuration, since a projecting dimension of the receiving portion 78 from the inner periphery of the second terminal unit 43 is reliably secured as a locking margin in the radial direction between the receiving portion 78 and the hooking portion 83, contact reliability is excellent.

The hooking portions 83 are disposed at a plurality of positions spaced apart in the circumferential direction. The constant diameter portion 80 having a constant inner diameter and continuous in the connecting direction of the second terminal unit 43 and the base end part 50P is formed in a region contactable by the hooking portions 83 on the inner periphery of the second terminal unit 43. According to this configuration, even if the adaptor 50 is inclined with respect to the second connector 30, the plurality of hooking portions 83 can reliably contact the constant diameter portion 80 on the inner periphery of the second terminal unit 43.

The adaptor 50 includes the movable dielectric 53 and the movable outer conductor 56 surrounding the movable dielectric 53. The movable outer conductor 56 is formed with the resilient arm portions 57 and the locking claws 85. The locking claws 85 are formed in the regions of the movable outer conductor 56 other than the resilient arm portions 57, and hold the movable dielectric 53 and the movable outer conductor 56 in the assembled state by being locked in the locking grooves 81. According to this configuration, since the rigidity of the resilient arm portions 57 is not reduced by forming the locking claws 85, the contact reliability of the second terminal units 43 and the hooking portions 83 is high.

The second connector 30 includes the peripheral wall portion 34 surrounding the adaptors 50 with the base end parts 50P connected to the second terminal units 43. The inclination of the adaptors 50 is restricted by contact with the peripheral wall portion 34. According to this configuration, since the inclination of the adaptors 50 is limited by the peripheral wall portion 34, the hooking portions 83 can reliably contact the inner periphery of the second terminal unit 43.

The first connector 10 includes the first terminal units 16 and is mounted on the first circuit board B. The second connector 30 includes the second terminal units 43 and is mounted on the second circuit board C with the second terminal units 43 facing the first terminal units 16. The adaptor 50 serving as a movable terminal unit is swingable with the second terminal unit 43 as a fulcrum, and includes the tip part 50T serving as the connecting end part to be connected to the first terminal unit 16. The first connector 10 includes the first terminal holding portion 12 for accommodating the first terminal units 16 and the guiding portion 14. The guiding portion 14 is disposed closer to the second connector 30 than the first surface 12S of the first terminal holding portion 12, and tapered from the base end 14P toward the tip 14T. The interference avoiding portion 75 is interposed between the outer peripheral edge of the front surface 12S of the first terminal holding portion 12 and the base end 14P of the guiding portion 14.

According to this configuration, in the process of connecting the first and second connectors 10, 30, the tip parts 50T of the adaptors 50 slide in contact with the guiding portion 14 to be guided and connected to the first terminal units 16. If the first and second connectors 10, 30 are positionally deviated in a direction intersecting the facing direction of the first and second terminal units 16, 43, the tip parts 50T reach the base end 14P of the guiding portion 14 and the guide by the guiding portion 14 is finished with the adaptors 50 inclined with respect to the facing direction of the both connectors 10, 30. At this time, since the tip surfaces of the tip parts 50T are oblique to the front surface 12S of the first terminal holding portion 12, the tip parts 50T project toward the front surface 12S of the first terminal holding portion 12 immediately before reaching the base end 14P of the guiding portion 14.

Here, a space for accommodating the tip parts 50T is secured between the base end 14P of the guiding portion 14 and the front surface 12S of the first terminal holding portion 12. Accordingly, the tip parts 50T reach the base end 14P of the guiding portion 14 without interfering with the front surface 12S of the first terminal holding portion 12 and are guided to directly face the first terminal units 16 and connected to the first terminal units 16. Therefore, the connector device A of this embodiment is high in the reliability of a connecting operation.

The first terminal holding portion 12 is formed with the first terminal accommodation chambers 13 open in the front surface 12S of the first terminal holding portion 12 and configured to accommodate the first terminal units 16. The tapered guiding surface 76 for guiding the tip part 50T into the first terminal accommodation chamber 13 is formed on the opening edge part of the first terminal accommodation chamber 13. According to this configuration, the tip part 50T can be reliably guided into the first terminal accommodation chamber 13.

The first terminal unit 16 includes the first inner conductor 17 and the first outer conductor 22 surrounding the first inner conductor 17. The tip part 50T includes the movable inner conductor 51 to be connected to the first inner conductor 17, the movable dielectric 53 surrounding the movable inner conductor 51 and the movable outer conductor 56 surrounding to the movable dielectric 53 and to be connected to the inner periphery of the first outer conductor 22. The tip surface of the movable dielectric 53 is exposed on the tip surface of the tip part 50T. The first inner conductor 17 is arranged only in the region backward of the back end 76E of the guiding surface 76.

According to this configuration, in the process of connecting the tip part 50T to the first terminal unit 16, the tip part 50T is positioned with respect to the first terminal unit 16 by starting the connection of the movable outer conductor 56 and the first outer conductor 22. However, at this point of time, the first inner conductor 17 is not in contact with the tip of the tip part 50T. Therefore, in the process of connecting the tip part 50T to the first terminal unit 16, the movable dielectric 53 does not interfere with the first terminal unit 16.

The guiding surface 76 has a circular cross-sectional shape perpendicular to the facing direction of the first and second terminal units 16, 43. The radius of curvature of the guiding surface 76 in the front surface 12S of the first terminal holding portion 12 is larger than half the interval between adjacent ones of the first terminal accommodation chambers 13. According to this configuration, the partition wall portions 77 partitioning between adjacent ones of the first terminal accommodation chambers 13 are arcuately recessed from the front surface 12S of the first terminal holding portion 12. In this way, the tip parts 50T hardly interfere with the front surface 12S of the first terminal holding portion 12.

[Other Embodiments]

The present invention is not limited to the above described and illustrated embodiment and is represented by claims. The present invention is intended to include all changes in the scope of claims and in the meaning and scope of equivalents and also include the following embodiments.

Although the receiving portion is formed only on the first terminal unit in the above embodiment, the receiving portions may be formed on both the first and second terminal units.

Although the hooking portions and the tapered slide contact portions are formed on both first and second connecting end parts in the above embodiment, the hooking portions and the tapered slide contact portions may be formed only on either one of the first and second connecting end parts.

Although the inclination angle of the hooking portion with respect to the connecting direction of the terminal unit and the connecting end part is equal to that of the receiving portion with respect to the connecting direction of the terminal unit and the connecting end part in the above embodiment, the inclination angle of the hooking portion and that of the receiving portion may be different angles.

Although the inclination angle of the tapered slide contact portion with respect to the connecting direction of the terminal unit and the connecting end part is equal to that of the tapered guide portion with respect to the connecting direction of the terminal unit and the connecting end part in the above embodiment, the inclination angle of the tapered slide contact portion and that of the tapered guide portion may be different angles.

Although the projecting ends of the hooking portions are in contact with the inner periphery of the terminal unit in the above embodiment, the outer surfaces of the resilient arm portions may be in contact with the projecting end of the receiving portion.

LIST OF REFERENCE NUMERALS

10 . . . first connector
11 . . . first housing
12 . . . first terminal holding portion
12S . . . front surface of first terminal holding portion
13 . . . first terminal accommodation chamber
14 . . . guiding portion
14P . . . base end of guiding portion
14T . . . tip of guiding portion
15 . . . first swinging space
16 . . . first terminal unit (terminal unit)
17 . . . first inner conductor
18 . . . small diameter portion
19 . . . claw portion
20 . . . large diameter portion
21 . . . first dielectric
22 . . . first outer conductor
23 . . . connection space
30 . . . second connector
31 . . . second housing
32 . . . second terminal holding portion
33 . . . second terminal accommodation chamber
34 . . . peripheral wall portion
35 . . . second swinging space
36 . . . side wall portion
37 . . . cut portion
38 . . . supporting wall portion
39 . . . holding space
40 . . . holding projection
41 . . . guide slope
42 . . . fixed-side facing surface
43 . . . second terminal unit (terminal unit)
44 . . . second inner conductor
45 . . . second dielectric
46 . . . second outer conductor

47 . . . supporting space
48 . . . diameter reduced portion
50 . . . adaptor
50P . . . base end part of adaptor (connecting end part)
50T . . . tip part of adaptor (connecting end part)
51 . . . movable inner conductor
52 . . . resilient claw piece
53 . . . movable dielectric (dielectric)
54 . . . insertion hole
55 . . . accommodation recess
56 . . . movable outer conductor (outer conductor)
57 . . . resilient arm portion
58 . . . diameter expanded portion
59 . . . deflection space
60 . . . alignment member
61 . . . plate-like body portion
62 . . . hole portion
63 . . . fixed projection
64 . . . fixed contact portion
65 . . . resilient contact piece
66 . . . movable projection
67 . . . movable contact portion
68 . . . resilient holding piece
69 . . . leg portion
70 . . . locking portion
71 . . . movable-side facing surface
72 . . . guided portion
75 . . . interference avoiding portion
76 . . . guiding surface
76E . . . back end of guiding surface
77 . . . partition wall portion
78 . . . receiving portion
79 . . . tapered guide portion
80 . . . constant diameter portion
81 . . . locking groove
82 . . . tapered slide contact surface
83 . . . hooking portion
84 . . . tapered slide contact portion
85 . . . locking claw
86 . . . escaping recess
$\alpha$ . . . inclination angle of receiving portion
$\beta$ . . . inclination angle of tapered guide portion
$\gamma$ . . . inclination angle of hooking portion
$\delta$ . . . inclination angle of tapered slide contact portion
A . . . connector device
B . . . first circuit board
C . . . second circuit board

What is claimed is:

1. A connector device, comprising:

a pair of connectors respectively mounted on a pair of circuit boards facing each other, each of the pair of connectors including a terminal unit; and an adaptor including a connecting end part, the adaptor being swingably connectable to the terminal unit, wherein:

the connecting end part is formed with a hooking portion radially projecting outward from the connecting end part, the terminal unit includes a receiving portion projecting radially inward from the terminal unit, the receiving portion configured to hold the adaptor in one of the pair of connectors by locking the hooking portion to the receiving portion, the terminal unit includes a tapered guide portion for guiding the connecting end part to the receiving portion to achieve a locked state, and an inclination angle of the receiving portion with respect to a connecting direction of the terminal unit and the connecting end part is larger than an inclination angle of the tapered guide portion with respect to the connecting direction of the terminal unit and the connecting end part.

2. The connector device of claim 1, wherein:

the connecting end part is formed with a tapered slide contact portion configured to slide in contact with the tapered guide portion in the process of locking the hooking portion to the receiving portion, and an inclination angle of the tapered slide contact portion with respect to the connecting direction of the terminal unit and the connecting end part is equal to the inclination angle of the tapered guide portion with respect to the connecting direction of the terminal unit and the connecting end part.

3. The connector device of claim 1, wherein:

the receiving portion projects radially inward from an inner periphery of the terminal unit, the connecting end part includes a resilient arm portion, the hooking portion projects radially outward from the resilient arm portion, and a projecting end of the hooking portion is in resilient contact with the inner periphery of the terminal unit.

4. The connector device of claim 1, wherein:

the hooking portion is disposed at each of a plurality of positions spaced apart in a circumferential direction of the connecting end part, and the terminal unit includes a constant diameter portion having a constant inner diameter in a connecting direction of the terminal unit, and the connecting end part is formed in a region of the adaptor that enables contact by the hooking portion with an inner periphery of the terminal unit.

5. The connector device of claim 3, wherein:

the adaptor includes a dielectric and an outer conductor surrounding the dielectric, the outer conductor is formed with the resilient arm portion and a locking claw for holding the dielectric and the outer conductor in an assembled state, and the locking claw is formed in a region of the outer conductor except the resilient arm portion.

6. The connector device of claim 1, wherein:

the one of the pair of connectors includes a peripheral wall portion surrounding the adaptor with the connecting end part connected to the terminal unit, and the swing of the adaptor is restricted by contact with the peripheral wall portion.

* * * * *